US006836596B2

(12) United States Patent
Kagawa et al.

(10) Patent No.: US 6,836,596 B2
(45) Date of Patent: Dec. 28, 2004

(54) METHOD FOR TUNING OPTICAL CHARACTERISTIC OF AN OPTICAL MODULE

(75) Inventors: Masayoshi Kagawa, Tokyo (JP); Hiroshi Matsuura, Tokyo (JP); Hajime Kazami, Tokyo (JP); Kazuaki Sato, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 68 days.

(21) Appl. No.: 10/401,304

(22) Filed: Mar. 26, 2003

(65) Prior Publication Data

US 2003/0231832 A1 Dec. 18, 2003

(30) Foreign Application Priority Data

Mar. 26, 2002 (JP) ........................................ 2002-086600

(51) Int. Cl.[7] .................................................. G02B 6/26
(52) U.S. Cl. ............................. 385/39; 385/33; 385/34; 385/60; 385/92
(58) Field of Search ............................. 385/24, 33, 34, 385/39, 60, 78, 88–94

(56) References Cited

U.S. PATENT DOCUMENTS

| 6,498,876 | B1 | * | 12/2002 | Liu et al. | ........................ 385/34 |
| 6,532,325 | B2 | * | 3/2003 | Liu et al. | ........................ 385/34 |
| 6,582,135 | B2 | * | 6/2003 | Brun et al. | ..................... 385/78 |
| 6,729,770 | B2 | * | 5/2004 | Brun et al. | ..................... 385/60 |
| 6,760,516 | B2 | * | 7/2004 | Brun et al. | ..................... 385/34 |

* cited by examiner

Primary Examiner—Phan T. H. Palmer
(74) Attorney, Agent, or Firm—Cantor Colburn LLP

(57) ABSTRACT

This invention relates to a method for tuning optical characteristic of an optical module. The tuning method in optical characteristic of an optical module consisting of an optical fiber, a lens, an optical filter and a filter holder, comprising: a step of tuning an optical characteristic to turn the optical filter or the said optical fiber around the axis offset from the center of the said optical filter.

5 Claims, 4 Drawing Sheets

METHOD FOR TUNING OPTICAL CHARACTERISTIC OF AN OPTICAL MODULE

BACKGROUND OF THE INVENTION

1. Field of the Invention

This invention relates to a method for tuning optical characteristic of an optical module.

2. Related Art

An optical filter has the distribution characteristic in the surface. This is generated by manufacturing an optical filter, an internal stress, in the principle etc. Therefore, an optical filter has the characteristic that the center wavelength of the transmission spectrum is different according to an incidence position of optical signal on the filter surface. Moreover, an optical filter has the angle dependency to the incident angle of optical signal.

A conventional optical module is composed of an optical fiber for input/output of optical signal, a lens for optically coupling the input fiber with output optical fiber, and an optical filter for multiplexing/de-multiplexing.

The edge surface of the optical fiber forms the slope. The slope surface is to control the reflection attenuation on the optical fiber edge surface. In a conventional optical module, the optical signal is exited from the optical fiber according to this slope surface of the optical fiber with a predetermined angle inclined to an optical axis based on Snell's law. The optical signal exited from the optical fiber is inputted the lens from the optical fiber with the position of the optical path and the position of the fiber axis shifted.

Therefore, because the position of incidence light to an optical filter changed, it was necessary to adjust the position of an optical filter in this optical module. Especially, in the case that the optical module has a high performance optical filter such as the narrowband band-pass filters, the highly accurate tuning in optical characteristic is indispensable.

Generally as the tuning method in optical characteristic of an optical module, there are known the first method of adjusting by changing the slope angle of an optical filter to the optical path, and the second method of adjusting by changing the position of an optical filter in vertical plane or in predetermined incident angle to the optical path.

However, in a reflection type optical module for instance, an optical fiber module and an optical wavelength multiplexing/de-multiplexing module (WDM module), the position where the reflected optical signal is coupled with formation changes according to slope angle of the slope surface when an optical characteristic is adjusted by the first method.

Therefore, there is a problem that it is necessary to adjust the position of the optical fiber, which couple the reflected optical signal whenever the slope angle of the slope surface is adjusted, thus assembly becomes difficult in a reflection type optical module.

Moreover, the change of the slope angle increases the insertion loss for ferrule, which has a plurality of optical fibers arranged at predetermined intervals.

Therefore, it is necessary to fix the slope angle so as to be a predetermined angle, and the tuning of an optical characteristic by the angle adjustment is impossible in the optical module having the above ferrule.

On the other hand, because the slope angle is maintained, the tuning method in optical characteristic of an optical module by the second method can be applied when an optical module has a plurality of optical fibers.

However, the angle adjustment function of the optical filter is needed for an optical module of the reflection type to unite the optical signal that can be reflected from the optical filter with the optical fiber on the output side. In other words, it is difficult to unite the optical signal that can be reflected from the optical filter with the optical fiber only by the mechanical accuracy of parts that compose the optical module.

Moreover, after the angle of the optical filter is adjusted, to achieve the function to fix adjusted angle and the function to fix the optical filter changed in a vertical plane to the optical path at the same time, the compositional parts increase extremely and the adjustment becomes difficult. Therefore, it is difficult to manufacture an optical module having high accuracy and high reliability at low cost.

SUMMARY OF THE INVENTION

The present invention is a method for tuning optical characteristic of an optical module comprising of an optical fiber, a lens, an optical filter and a filter holder, comprising: a step of arranging said optical fiber, said lens, said optical filter fixed said filter holder, a step of tuning an optical characteristic to turn the optical filter or the said optical fiber around the axis offset from the center of said optical filter.

DETAILED DESCRIPTION

Embodiments of the present invention will be described below with reference to the drawings.

Figure 1:
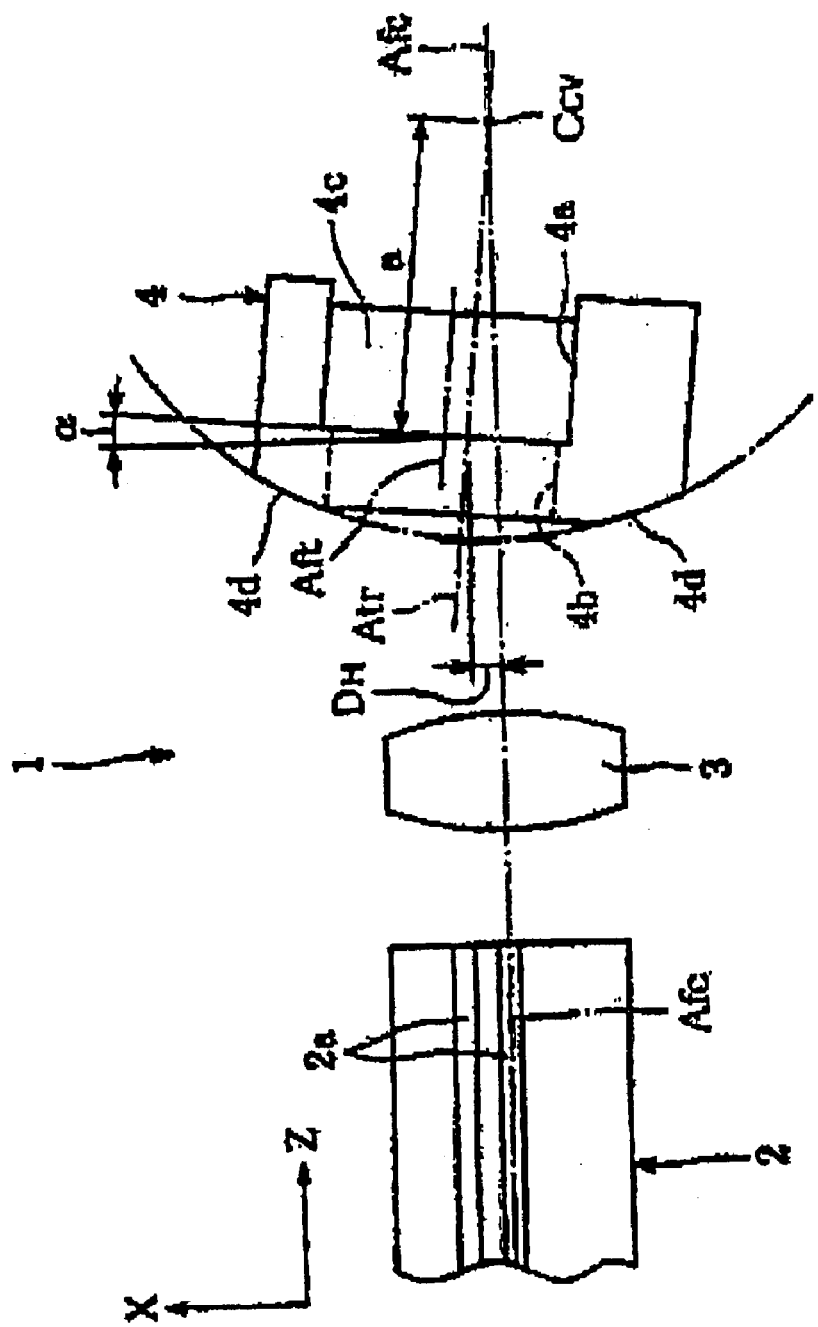
FIG. 1 is exploded view of an optical module according to one embodiment of the present invention.

The optical module 1 to which the tuning method of the invention is applied comprises a ferrule 2, a lens 3, and a filter holder 4 as shown in FIG. 1.

Here, it assume that the direction of two fibers to be arranged as described later is X axis, the direction along the center axis Afc of the ferrule 2 described later is Z axis, the vertical direction to X axis and Z axis is Y axis.

Figure 2:
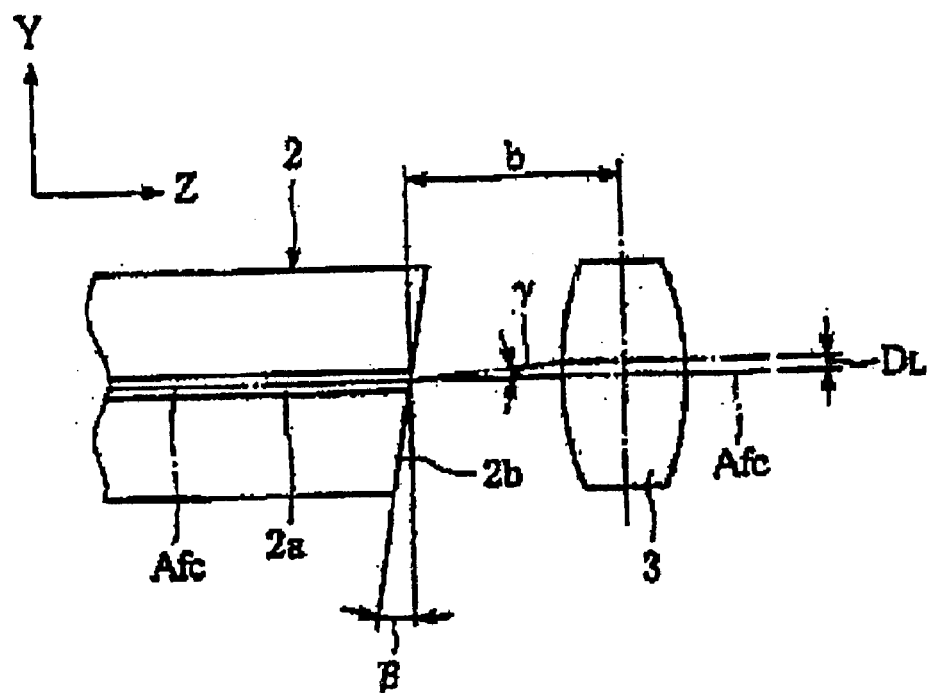
FIG. 2 is a plan view to explain optical path shift due to the slope of ferrule used in an optical module as shown in FIG. 1.

Ferrule 2 fixes two optical fibers 2a arranged in X axis holder as shown in FIG. 1 by a predetermined pitch, and the center axis Afc is corresponding to the center of one of the optical fiber 2a. Moreover, the ferrule 2 is ground on edge surface of the output side opposed to the lens 3, and is molded on the slope 2b which inclines Y axis direction as shown in FIG. 2.

The respective optical signals launched from each optical fiber are incident to the lens 3, then made parallel in the lens 3, and launched from the lens 3.

The filter holder 4 is a formation of filter hole 4a and an aperture 4b to a cylindrical part. An optical filter 4c is fixed to the filter hole 4a. The launched optical signal from lens 3 is incident to the aperture 4b. A curved surface 4d, with predetermined curvature (the center of curvature; CCV), is formed on the lens 3 side of the filter holder 4.

The center of filter hole 4a offsets the center of filter holder 4 to the eccentric position as shown in FIG. 1. In a word, the center of filter holder 4 and the center of optical filter 4c shift.

Figure 5:
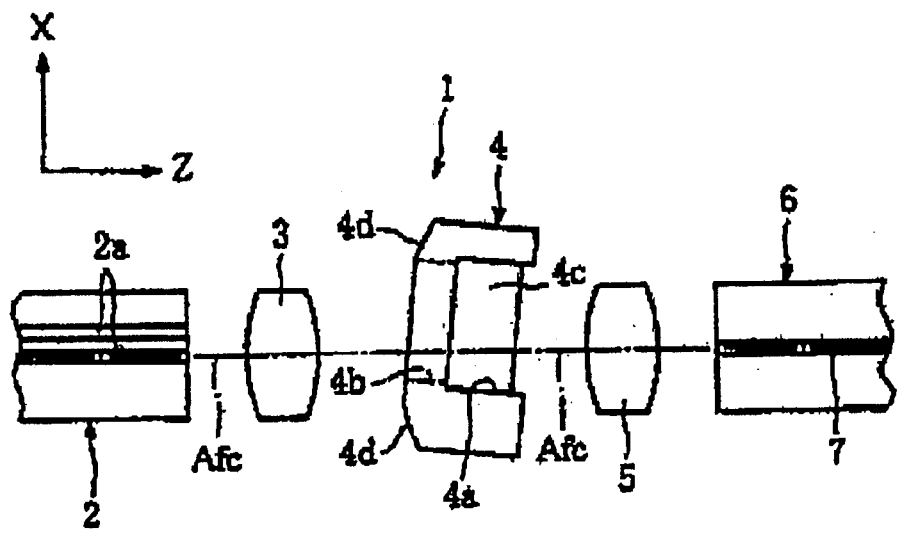
FIG. 5 is an exploded view of other elements of an optical module as shown in FIG. 1.

The optical module 1 comprises a ferrule 2, a lens 3, a filter holder 4, a lens 5, and a ferrule 6 as shown in FIG. 5. An optical fiber 6a is fixed to the single fiber ferrule 6. These parts are welded by YAG laser and assembled to form the optical module 1.

In this case, it is preferable that the ferrule 2 and the single fiber ferrule 6 have the structure movable in the direction of Z-axis.

The movement means is not especially limited even if both the ferrule 2 and the single fiber ferrule 6 can be moved in several $\mu$m steps in the direction of Z-axis. The edge surfaces of the ferrules 2, 6 can be set to the focus position of the lens by making both ferrules 2, 6 such a structure. As a result, the transmission loss of optical module 1 becomes low.

The positions of both ferrules 2 and 6 are decided as follows. First of all, it is incident from one side of the ferrule 2 or the single fiber ferrule 6 as for optical signal. The amount of transmission loss is measured while moving both ferrules 2 and/or 6 in the Z-axis. Both ferrules 2 and 6 are fixed at the position in which the amount of transmission loss becomes the minimum value. The sleeve and the body positioned outer side of the sleeve are welded by YAG laser to fix the position.

In the optical module 1 mentioned above, the distance between the optical path and the center of the optical filter 4c is determined by the slope of the filter holder 4, the optical path shift due to the slope plane 2b, and offset direction of the optical filter 4c at the filter holder 4.

Therefore, the distance between the optical path and the center of optical filter 4c can be changed by rotating the filter holder 4 around a rotation Atr-axis. The rotation Atr-axis is an axis that passes CCV of the filter holder 4 and the center of the filter holder 4, and it is vertical in respect of the optical filter 4c.

Therefore, in the case of using band-pass filter, which has distribution characteristic wherein the center wavelength of transmission loss is positioned at the center portion of the filter, as the optical filter 4c, the optical module 1 can be tuned in wavelength to change the distance from the optical path to the center of the optical filter 4c.

Then, it first explains the shift of the rotation Atr-axis due to the slope of the filter holder 4, that is, the slope of the optical filter 4c.

The filter holder 4 has the slope angle $\alpha$ so that the center of curvature CCV of the curve plane 4d is on the center Afc-axis of the ferrule 2, and the lunched optical signal from one of optical fiber 2a is reflected with optical filter 4c, and is coupled with the other optical fiber 2a.

In the filter holder 4 having the slope angle $\alpha$, the rotation Atr-axis is away of the distance DH from the center Afc-axis of the ferrule 2 at the front surface of the optical filter 4c.

The distance DH is determined by the distance between the center of curvature CCV and the optical filter 4c as shown in FIG. 1 and the slope angle $\alpha$ of filter holder 4, so that it is shown by the following equation (1)

$$DH = a \times \cos \alpha \tag{1}$$

Next, it explains the optical path shift due to slope plane 2b of ferrule 2.

In case that the slope plane 2b in the ferrule 2 is slope angle $\beta$, the angle $\gamma$ of the optical signal launched from the optical fiber 2a and the center Afc-axis is shown in equation (2) from Snell's law if the refractive index in the core in optical fiber 2a is assumed to be $n_c$, and the refractive index is assumed to be $n_a$ as shown in FIG. 2.

Moreover, the distance of said launched optical signal after passing the lens 3 and center Afc-axis is shown in equation (3) if back focusing distance of the lens 3 is assumed to be b.

$$\gamma = \arcsin(nc/na \times \sin \beta) - \beta \tag{2}$$

$$DL = b \times \tan \gamma \tag{3}$$

Figure 3:
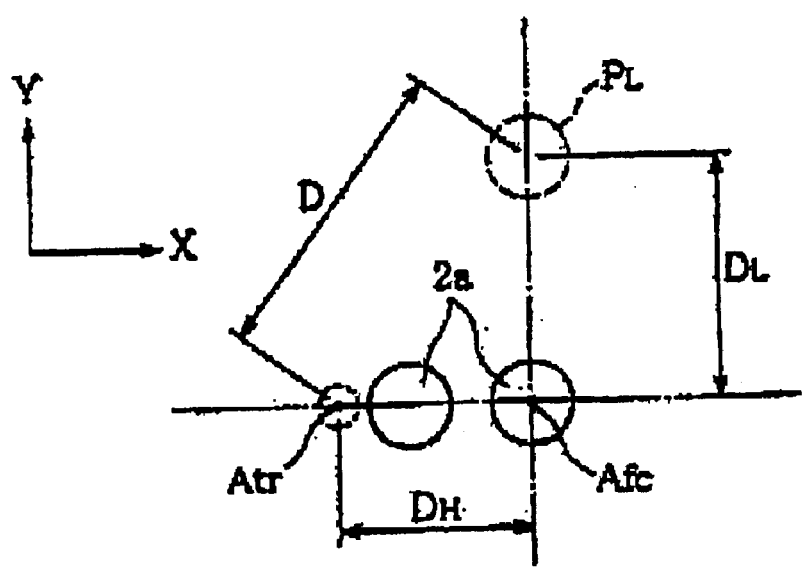
FIG. 3 is an explanatory view of the distance with the center of the rotation axis and the optical path seen on a vertical section to a center axis of ferrule.

Moreover, it is shown in FIG. 3 that the distance Dh and the distance DL are seen on a vertical section to center Afc-axis of ferrule 2. Therefore, the distance D from the rotation Atr-axis to the center of the optical path PL is shown in the next equation (4) in FIG. 3.

$$D = (DL^2 + DH^2)^{1/2} \tag{4}$$

Therefore, the filter holder 4, which is offset the distance D from center Aft-axis of the optical filter 4c to rotation Atr-axis as shown in FIG. 1, is prepared according to the method of the tuning in an optical characteristic of the optical module of present invention.

Figure 4:
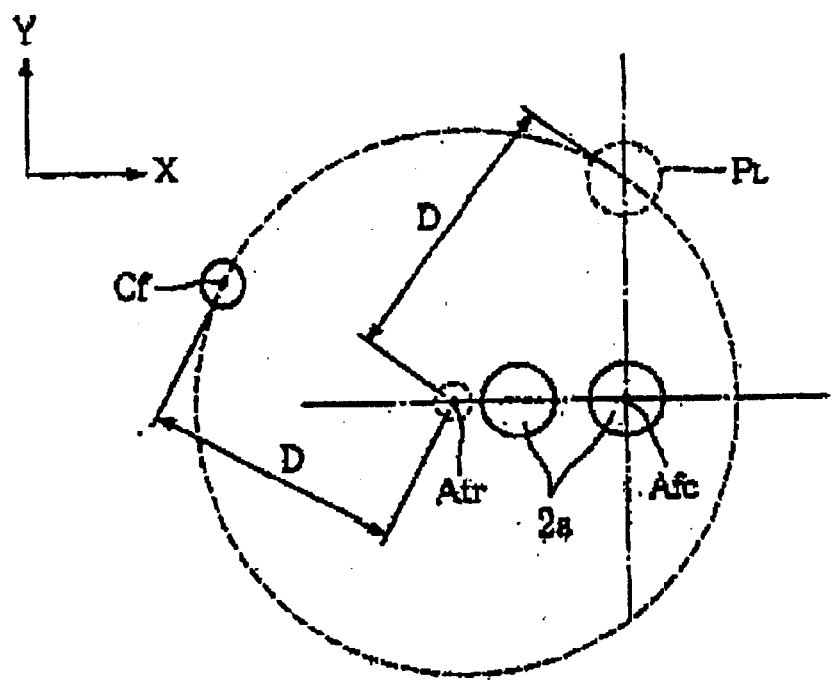
FIG. 4 is an explanatory view of the adjustment of the distance of the center of an optical filter and the center of the optical path as shown in FIG. 3.

Then, when the lens holder 4 set as mentioned above is rotated around the rotation Atr-axis, the center Cf of the optical filter 4c moves on the circumference along tracks shown in FIG. 4 in the dotted line.

Therefore, the distance from the center Cf of the optical filter 4c to the optical path PL can be adjusted in the range of 0–2D by using like the lens holder 4 as shown in FIG. 4.

Therefore, the optical characteristic of the optical module 1 can be tuned with high accuracy compared with the conventional tuning method by the one time adjusting operation wherein the lens holder 4 is rotated around the rotation Atr-axis in the present invention.

Figure 6:
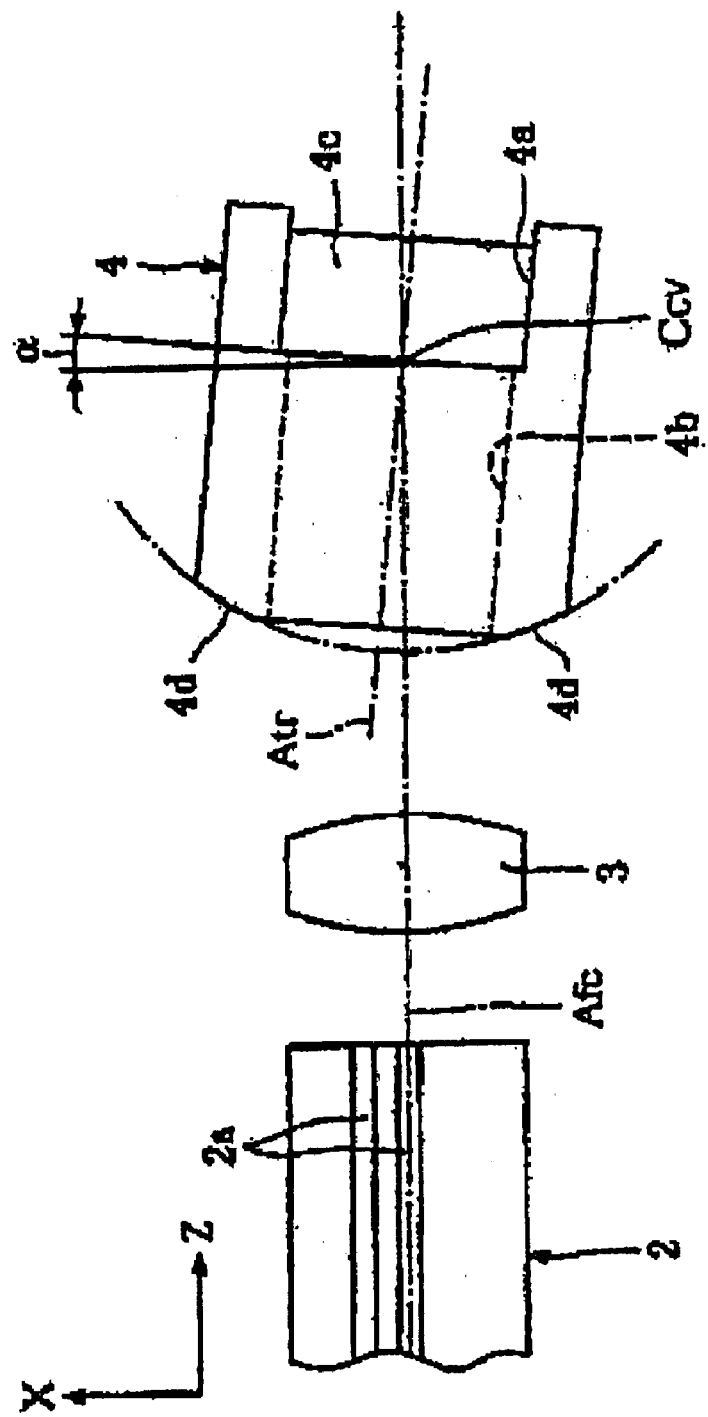
FIG. 6 is an exploded view of an optical module according to another embodiment of the present invention.

Moreover, the distance a between the center of curvature CCV and the optical filter 4c is made shorter. That is, the center of the curvature CCV on the curve side 4d of the filter holder 4 is made to agree (a=0) in the front surface of the optical filter 4c as shown in FIG. 6. As a result, the distance DH, that is the distance between the rotation Atr-axis and the center Afc-axis of ferrule 2 is reduced and (DH=0), as clearly shown from equation (1).

This can be achieved by, for instance, optimizing the position corresponding to the curve face 4d of holder 4 and the center of the curvature CCV on the curve face 4d. Moreover, it is efficient measures to move multiple layer surface of the optical filter 4c to the lens 5 side from the viewpoint of a size and an optical characteristic of an optical module for this achievement.

Therefore, in the filter holder 4, omitting the adjustment by the rotation around rotation Atr-axis, by assuming distance a=0 for instance according to the relation to the distribution in the surface of the optical filter 4c used, becomes possible.

When the optical module 1 is assembled by using the optical filter for DWDM (Dense-Wavelength Division Multiplexing) that wavelength interval is set to 100 GHz for instance, and using the tuning method by the method of the present invention explained above, the amount of the adjustment in the center wavelength tuning of an optical filter can be adjusted to over 1/10 of wavelength intervals, the adjustment accuracy in the center wavelength of an optical filter can be adjusted to under ±1/100 of wavelength intervals, and the yield of the optical module assembled increases five times compared with a conventional tuning method.

In the above-mentioned embodiment, the optical characteristic of the optical filter is tuned by being offset distance D from center Aft-axis to rotation Atr-axis. However, the rotation Atr-axis may be offset from the center of the optical filter to shift center of curvature CCV on curve face 4*d* in filter holder 4 from center Afc-axis of the ferrule 2. Moreover, the optical characteristic can be tuned to rotate the optical fiber around the rotation axis offset from center of the optical filter, opposite to abovementioned embodiment in the method of present invention.

Furthermore, the method of present invention can be applied regardless of the kind of an optical filter and the structure of a ferrule.

A tuning method in optical characteristic of an optical module, wherein a assembly of an optical module is easy, it is possible to tune an optical characteristic even if the optical fiber is a plural, an increase in the number of compositional parts is suppressed, and an optical module which can be manufactured with high accuracy, cheapness, and high reliability, can be offered.

What is claimed is:

1. A method for tuning optical characteristic of an optical module including an optical fiber, a lens, an optical filter and a filter holder, comprising the steps of:
    arranging said optical fiber, said lens, said optical filter and said filter holder;
    turning the optical filter or the optical fiber around an axis offset from a center of said optical filter to tune optical characteristic.

2. A method for tuning optical characteristic of an optical module according to claim 1, wherein a distance of said offset of the axis is determined by slope of the filter holder.

3. A method for tuning optical characteristic of an optical module according to claim 1, wherein a distance of said offset of the axis is determined by the optical path shift due to a slope plane formed at end surface of the optical fiber.

4. A method for tuning optical characteristic of an optical module according to claim 1, wherein a distance of said offset of the axis is determined by an offset direction of the optical filter.

5. A method for tuning optical characteristic of an optical module according to claim 1, wherein said optical filter has distribution characteristic on the surface thereof.

* * * * *